(12) United States Patent
Omura

(10) Patent No.: US 6,956,611 B2
(45) Date of Patent: Oct. 18, 2005

(54) PROJECTION APPARATUS AND PHOTOTAKING APPARATUS HAVING THE SAME

(75) Inventor: Yusuke Omura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 885 days.

(21) Appl. No.: 09/915,326

(22) Filed: Jul. 27, 2001

(65) Prior Publication Data

US 2002/0027607 A1    Mar. 7, 2002

(30) Foreign Application Priority Data

Jul. 31, 2000  (JP) .............................. 2000-232470

(51) Int. Cl.⁷ ............................................. G03B 13/00
(52) U.S. Cl. ..................................... 348/345; 348/335
(58) Field of Search ............................. 348/345, 359, 348/335; 396/106, 107, 109

(56) References Cited

U.S. PATENT DOCUMENTS

| | | | |
|---|---|---|---|
| 4,801,963 A | 1/1989 | Koyama et al. | 354/403 |
| 4,958,180 A | 9/1990 | Matsui et al. | 354/403 |
| 4,963,911 A * | 10/1990 | Matsui et al. | 396/113 |
| 5,150,146 A * | 9/1992 | Ueda et al. | 396/104 |
| 5,305,047 A * | 4/1994 | Hayakawa et al. | 396/106 |
| 5,850,578 A * | 12/1998 | Ohmura | 396/109 |
| 5,943,515 A | 8/1999 | Omura | 396/106 |
| 6,670,992 B2 * | 12/2003 | Irie | 348/350 |

FOREIGN PATENT DOCUMENTS

| | | |
|---|---|---|
| JP | 2-101413 | 4/1990 |
| JP | 63-47710 | 2/1998 |

* cited by examiner

Primary Examiner—Aung Moe
Assistant Examiner—Jacqueline Wilson
(74) Attorney, Agent, or Firm—Fitzpatrick, Cella, Harper & Scinto

(57) ABSTRACT

A projection apparatus projects a pattern image onto an object so as to detect, by a phase difference scheme, a focus state of a phototaking system or observation system. The projection apparatus includes a first projecting system for projecting a first pattern extending in a first direction to a plurality of positions arranged in the first direction and including a central focus detection region on the object and a second projecting system for projecting a second pattern extending in a second direction to a plurality of positions arranged in the second direction and including the central focus detection region on the object.

13 Claims, 8 Drawing Sheets

PROJECTION APPARATUS AND PHOTOTAKING APPARATUS HAVING THE SAME

BACKGROUND OF THE INVENTION

1. Field of the Invention

The present invention relates to a projection apparatus for projecting a pattern image to an object so as to detect the focus state of a phototaking system or observation system and a phototaking apparatus using the same, and particularly, the invention is preferable to an apparatus for detecting, by a phase difference scheme, the focus state of a phototaking system or observation system on the basis of the reflected light-received image of a pattern image projected to an object.

2. Related Background Art

If the luminance or contrast of an object is low, some apparatuses for optical devices such as cameras, cinecameras, and video cameras using the TTL scheme illuminate the object with an illumination (projecting) unit incorporated in the camera body or strobe unit, or project onto the object the image of a projecting pattern which has a predetermined pattern and is incorporated in the illumination unit together with a projecting lens, thereby giving contrast for focus detection.

FIG. 12 is a view showing the arrangement of a projecting system in a projection apparatus of a type which projects a pattern image onto an object. Referring to FIG. 12, a light source 104 is formed from, e.g., an LED. A projecting pattern (mask) 103 has light-shielding portions 103a and light-transmitting portions 103b formed from, e.g., a plurality of linear strips, as shown in FIG. 13. The projecting system also has a projecting lens 102.

Referring to FIG. 12, the object side is irradiated through the projecting lens 102 with, of light components from the light source 104, a light component transmitted through the light-transmitting portions 103b. A pattern image corresponding to the projecting pattern 103 is projected onto the object. The reflected image of the pattern image is received and detected by a focus detection system (not shown) of phase difference scheme, thereby detecting the focus state of the phototaking system.

FIG. 14 is a view showing the irradiation (illumination) range of projected light and the projected pattern image on the object. Referring to FIG. 14, a dotted line 121 indicates the illumination range, and hatched portions 122 indicate the pattern image.

In such a projection apparatus, the focus detection range of a phototaking apparatus on which the projection apparatus is installed is often located at the center of the phototaking frame (the optical axis center of the phototaking lens), and only the center of the object side is illuminated with the projected light except for parallax correction.

In recent years, a camera for detecting focus states at a plurality of points on an object has been proposed. In this case as well, the above-described scheme of projecting a pattern image with a predetermined pattern to the object side and detecting a reflected pattern image from the object to execute focus detection is effectively used. In another proposed scheme, instead of laying out a focus detection region only in one of the horizontal and vertical directions in the phototaking frame, focus detection regions are laid out in both the horizontal and vertical directions such that the focus detection regions in the two directions cross at the central portion of the frame. This apparatus aims at obtaining a satisfactory focus detection result without any limitation on the contrast direction of the object.

In such a projection apparatus used for a phototaking apparatus having a plurality of focus detection regions or focus detection regions laid out in two directions perpendicular to each other, it is difficult to simultaneously project a pattern image to the plurality of focus detection regions using a projecting system of conventional scheme.

To simultaneously project a pattern image to a plurality of points, a large pattern image must be prepared in advance and formed in a wide range. Alternatively, a pattern image with a very fine pattern must be formed in a wide range using a projecting lens having a wide view angle and a very short focal length.

In either case, to form a satisfactory pattern image on an object, the aberration of the projecting lens must be satisfactorily corrected throughout a wide view angle. It is considerably difficult to realize it with a compact arrangement. In addition, in the above-described scheme of preparing a large pattern image, the light source for illuminating the large pattern image must be made large, and no compact arrangement can be obtained.

Furthermore, in the above-described scheme of forming a pattern image using a projecting lens with a very short focal length, the aperture of the projecting lens can hardly be made large, and therefore, the reach of illumination light cannot be made sufficiently long. It is also hard to prepare a very fine pattern image.

To solve these problems, Japanese Patent Application Laid-Open No. 63-47710 proposes an apparatus which implements the above-described scheme of preparing a large pattern image using a plurality of illumination light sources. However, this arrangement cannot solve the above-described problem of projecting lens aberration correction.

Considering this point, the present assignee has proposed, in Japanese Patent Application Laid-Open No. 2-101413, a projection system for focus detection which uses, as a projecting lens for projecting a pattern image, a plurality of lenses having an aperture shape long in the longitudinal direction of the stripes of the pattern image and short in the vertical direction of the stripes.

Along with the demand for a large focus detection region of the phototaking apparatus, the pattern image projecting range of the projection apparatus must also become large. In addition, a pattern image projecting scheme that is effective when focus detection regions in the two directions cross at the central portion of the phototaking frame has not been proposed yet.

SUMMARY OF THE INVENTION

It is an object of the present invention to provide a projection apparatus which can satisfactorily project a pattern image, especially when focus detection regions of a phototaking apparatus (or an observation apparatus) in two directions cross, to both the cross portion and the focus detection regions other than the cross portion, and the phototaking apparatus using the projection apparatus.

In order to achieve the above object, according to the first aspect of the present invention, there is provided a projection apparatus which projects a pattern image onto an object so as to detect, by a phase difference scheme, a focus state of a phototaking system or observation system, comprising a first projecting system for projecting a first pattern extending in a first direction to a plurality of positions arranged in the first direction and including a central focus detection region on the object; and a second projecting system for projecting a second pattern extending in a second direction to a plurality of positions arranged in the second direction and including the central focus detection region on the object.

As a further aspect of the invention, a difference is generated between brightness of the pattern image projected by one of the first and second projecting systems and that of the pattern image projected by the other projecting system.

As a further aspect of the invention, the first projecting system and the second projecting system have light sources which have the same characteristics, and the number of pattern images projected by one of the first and second projecting systems is made smaller than the number of pattern images projected by the other projecting system so as to make the pattern image projected by one projecting system brighter than that projected by the other projecting system.

As a further aspect of the invention, the first projecting system has a projecting optical element having a plurality of projecting optical axes in the first direction, and the second projecting system has a projecting optical element having a plurality of projecting optical axes in the second direction.

As a further aspect of the invention, the projecting optical elements of the first and second projecting systems are lenses.

As a further aspect of the invention, the projecting optical elements of the first and second projecting systems are prisms.

As a further aspect of the invention, the first projecting system and the second projecting system have light sources which has the same characteristics, the first and second projecting systems have identical pattern masks arranged in front of the light sources to form the respective patterns, and projecting optical elements which have the same characteristics and a plurality of projecting optical axes, and the first and second projecting systems are laid out to be phase-shifted each other by 90° when viewed from a direction of optical axis.

As a further aspect of the invention, the number of pattern images projected by one of the first and second projecting systems is a predetermined number smaller than the number of pattern images projected by the other projecting system.

As a further aspect of the invention, one projecting system has a synthesizing optical element for synthesizing the plurality of pattern images formed by a projecting optical element of one optical system into the predetermined number of pattern images and projecting the pattern images.

In order to achieve the above object, according to the present invention, there is provided a focus detection unit for detecting a focus state of a phototaking system; and a mounting portion adapted to mount of the projection apparatus, and an phototaking optical system or observation optical system, wherein a projection apparatus which projects a pattern image onto an object and detects, by a phase difference scheme, a focus state of a phototaking system or observation system on the basis of a reflected image, comprises one or two light sources, a first projecting system, and a second projecting system, the first projecting system projects a pattern image formed by light from one light source to a plurality of positions on the object which correspond to focus detection regions in a horizontal direction, including a frame center, the second projecting system projects a pattern image formed by light from one light source to a plurality of positions on the object which correspond to focus detection regions in a vertical direction, including the frame center, and focusing operation of the phototaking apparatus detects a focus state of the phototaking system using a pattern image projected by the projection apparatus and performs focus adjusting operation of the phototaking system on the basis of the detection result.

DETAILED DESCRIPTION OF THE PREFERRED EMBODIMENTS (First Embodiment)

Figure 1:
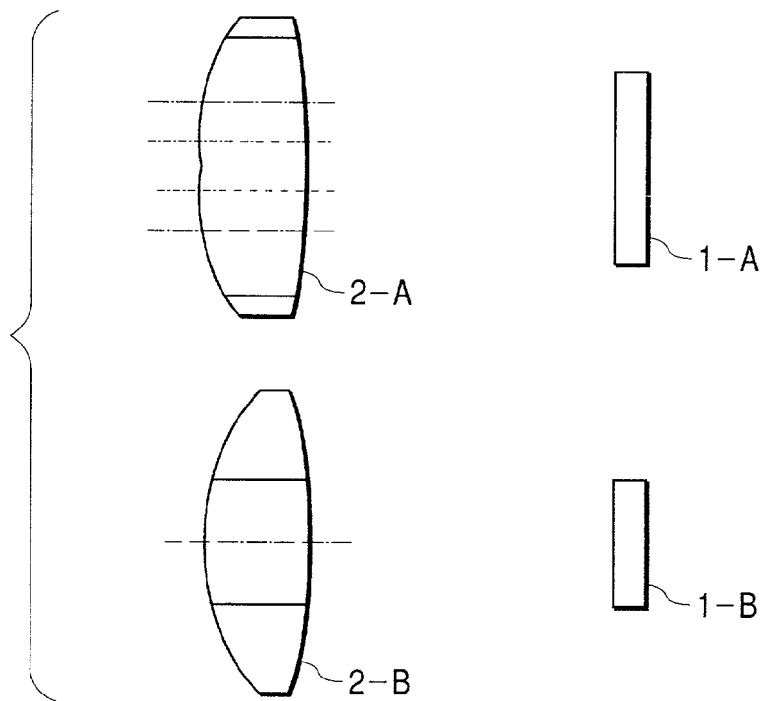
FIG. 1 is a sectional view of projecting systems in a projection apparatus according to the first embodiment of the present invention.
Figure 2:
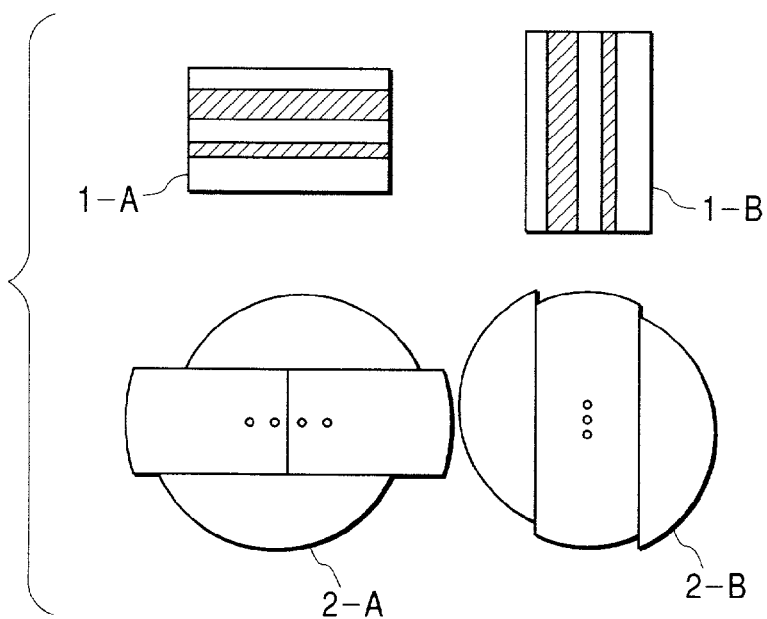
FIG. 2 is a front view of the projecting systems.

FIGS. 1 and 2 show the arrangement of a pattern image projecting system in a projection apparatus according to the first embodiment of the present invention. FIG. 1 is a sectional view of the projecting system when viewed from a direction perpendicular to the optical axis. FIG. 2 is a front view of the projecting system when viewed from the direction of optical axis (front).

The projection apparatus of this embodiment is incorporated (or incorporatable) in a phototaking apparatus such as a camera or an observation apparatus such as a telescope and used for detecting the focus state of the phototaking system or observation system. Focus detection is performed using a pattern image projected by the projection apparatus by a focus detection apparatus provided in a phototaking apparatus or an obsevation apparatus, and the result is sent to the control circuit of the phototaking apparatus or observation apparatus and used to control focusing of the phototaking system or observation system.

The projecting system is formed from a first projecting system A and second projecting system B, which are independent of each other.

Referring to FIGS. 1 and 2, an LED 1-A serves as the light source of the first projecting system A and has, in its front, a linear pattern electrode (pattern mask) as a first pattern extending in the horizontal direction (first direction). An LED 1-B serves as the light source of the second projecting system B and has, in its front, a linear pattern electrode (pattern mask) as a second pattern extending in the vertical direction (second direction).

A projecting lens (projecting optical element) 2-A of the first projecting system A corresponds to the light source 1-A. A projecting lens (projecting optical element) 2-B of the second projecting system B corresponds to the light source 1-B.

The projecting lens 2-A has an aperture shape long in the horizontal direction and short in the vertical direction. The projecting lens 2-A has four optical axes indicated by o in FIG. 2 and linearly arrayed in the horizontal direction, and projects, to the object side, four pattern electrode images (pattern images) formed by light from the LED 1-A and arrayed in the horizontal direction.

The projecting lens 2-B has an aperture shape long in the vertical direction and short in the horizontal direction. The projecting lens 2-B has three optical axes indicated by o in FIG. 2 and linearly arrayed in the vertical direction, and projects, to the object side, three pattern electrode images (pattern images) formed by light from the LED 1-B and arrayed in the vertical direction.

Figure 3:
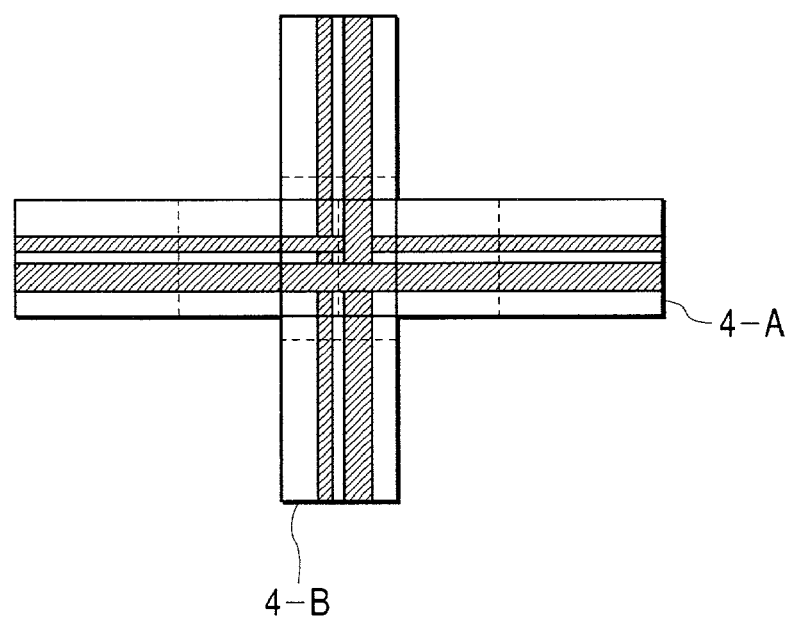
FIG. 3 is an explanatory view of pattern images projected by the projecting systems.

FIG. 3 is an explanatory view showing the pattern images projected to the object side by the projecting systems. For a projected pattern image 4-A, four pattern images projected through the projecting lens 2-A are arrayed in the horizontal direction to form a series of pattern images. For a projected pattern image 4-B, three pattern images projected through the projecting lens 2-B are arrayed in the vertical direction to form a series of pattern images.

Figure 4:
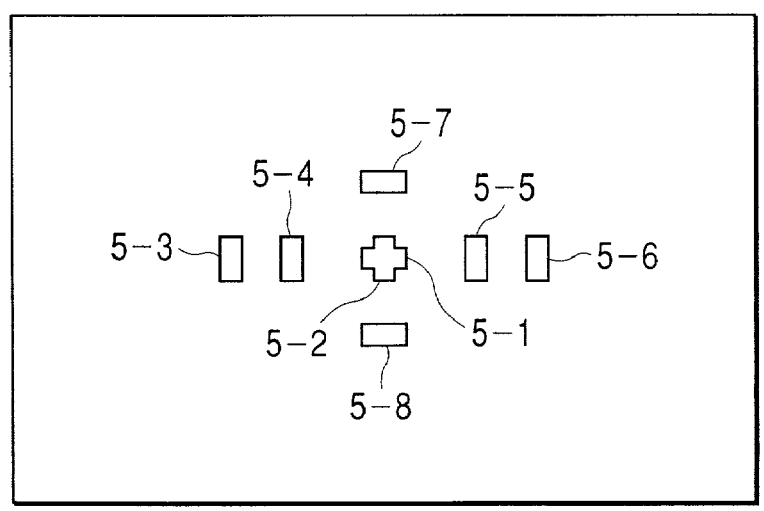
FIG. 4 is a view showing the focus detection regions of the phototaking apparatus.

FIG. 4 is a view showing focus detection regions in the phototaking apparatus on which the projection apparatus according to this embodiment is mountable. Focus detection regions (central focus detection regions) 5-1 and 5-2 extending in the vertical and horizontal directions form a cross at the central portion of the frame. Focus detection regions 5-3, 5-4, 5-5, and 5-6 are laid out in set of two on both sides of the focus detection region 5-2 in the horizontal direction. The five focus detection regions 5-2 to 5-6 laid out in the horizontal direction have a shape long in the vertical direction.

Focus detection regions 5-7 and 5-8 are laid out singly on both sides of the focus detection region 5-1 in the vertical direction. The three focus detection regions 5-1, 5-7, and 5-8 laid out in the vertical direction have a shape long in the horizontal direction.

The focus detection apparatus of the phototaking apparatus mentioned in relation to FIG. 4 detects the focus state of a phototaking system or observation system using a phase difference detection scheme. Correlation calculation for the focus state detection is done along the longitudinal direction of each focus detection region (the direction perpendicular to the longitudinal direction of the pattern image).

Figure 5:
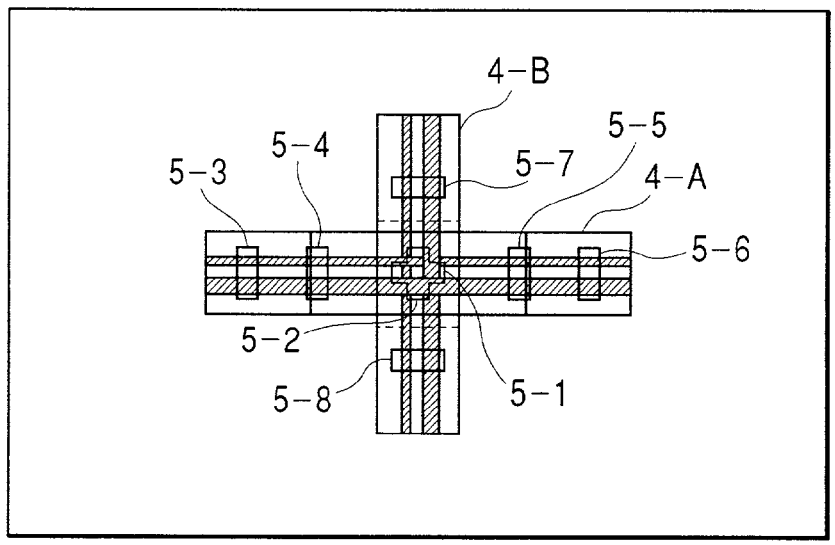
FIG. 5 is a view showing pattern images projected by the projecting systems and the focus detection regions of the focus detection apparatus.

FIG. 5 is a view showing the overlapped state of the pattern images projected onto the object by the projecting systems and the focus detection regions shown in FIG. 4. The pattern image 4-A overlaps a position corresponding to the focus detection regions 5-2 to 5-6 laid out in the horizontal direction of the object. The pattern image 4-B overlaps a position corresponding to the focus detection regions 5-1, 5-7, and 5-8 laid out in the vertical direction of the object.

The first and second projecting systems A and B use, as the LEDs 1-A and 1-B, light sources having the same characteristics. If the projecting lenses have the same focal length, the brightness of the projected image is proportional to the projecting area of the lens (i.e., the image becomes brighter as Fno becomes small). As compared to the pattern image 4-A formed from a series of four pattern images formed by splitting the light beam from the LED 1-A into four components by the projecting lens 2-A, the pattern image 4-B formed from a series of three pattern images formed by splitting the light beam from the LED 1-B into three components by the projecting lens 2-B which is divided into three parts to make the area of the central lens for projecting the light to the central portion relatively large is brighter at the central portion. For this reason, the contrast of the image signal received by the focus detection regions 5-1, 5-7, and 5-8 that are long in the horizontal direction becomes high, and the focus detection accuracy improves.

The focus detection apparatus having the focus detection regions 5-1 and 5-2 that form a cross at the central portion can detect the focus state without generating any illuminance difference between the pattern images projected in the horizontal and vertical directions. However, when one pattern image is made brighter than the other pattern image, as in this embodiment, the contrast on one pattern image side increases, and the focus detection accuracy generally improves.

(Second Embodiment)

Figure 6:
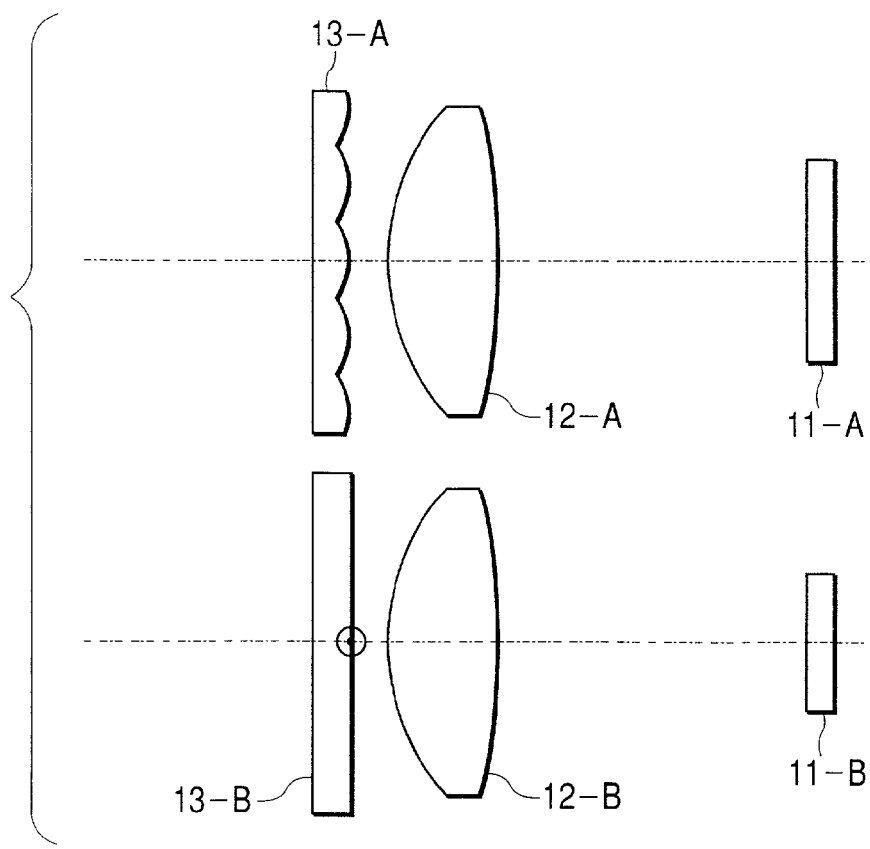
FIG. 6 is a sectional view showing projecting systems in a projection apparatus according to the second embodiment of the present invention.
Figure 7:
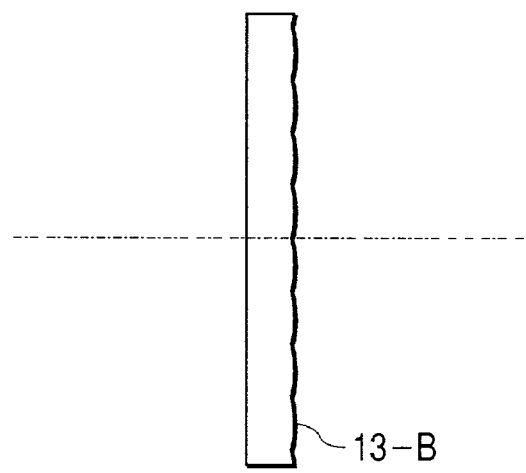
FIG. 7 is a sectional view of a projecting panel of the second embodiment.

FIG. 6 is a sectional view showing the arrangement of pattern image projecting systems in a projection apparatus according to the second embodiment of the present invention. FIG. 7 is a sectional view of the projecting system when viewed from the direction of optical axis.

The projection apparatus of this embodiment is incorporated (or incorporatable) in a phototaking apparatus such as a camera or an observation apparatus such as a telescope and used for detecting the focus state of the phototaking system or observation system. Focus detection is performed using a pattern image projected by the projection apparatus by a focus detection apparatus provided in a phototaking apparatus or an observation apparatus, and the result is sent to the control circuit of the phototaking apparatus or observation apparatus and used to control focusing of the phototaking system or observation system.

The projecting system is formed from a first projecting system A and second projecting system B, which are independent of each other.

Referring to FIG. 6, an LED 11-A serves as the light source of the first projecting system A and has, in its front, a linear pattern electrode (pattern mask) as a first pattern extending in the horizontal direction. An LED 11-B serves as the light source of the second projecting system B and has, in its front, a linear pattern electrode (pattern mask) as a second pattern extending in the vertical direction.

A projecting lens 12-A of the first projecting system A corresponds to the light source 11-A. A projecting lens 12-B of the second projecting system B corresponds to the light source 11-B. Each of the projecting lenses 12-A and 12B has only one optical axis, unlike the projecting lenses of the first embodiment.

Projecting panels (projecting optical elements) 13-A and 13-B have prism portions for projecting, to a plurality of directions, pattern images transmitted through the projecting lenses 12-A and 12B. As shown in FIG. 7, the projecting panel 13-B has prism components in a direction perpendicular to the projecting panel 13-A.

Figure 8:
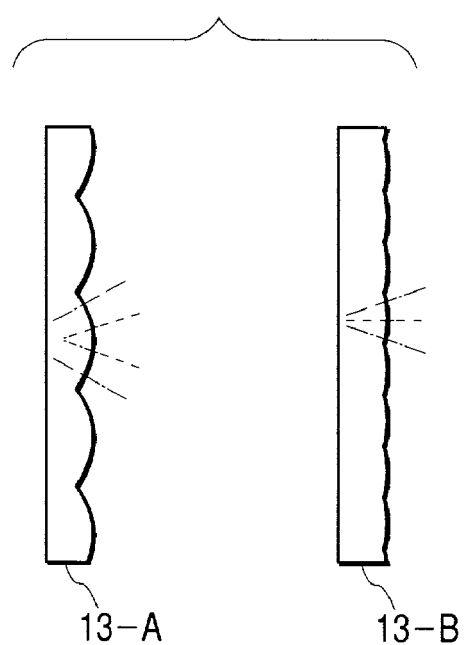
FIG. 8 is an explanatory view of the optical function of the projecting panels of the second embodiment.

FIG. 8 is a view showing the optical function of the prism portions of the projecting panels 13-A and 13-B. Actually, the projecting panels 13-A and 13-B are phase-shifted each other by 90° (in an ectending direction of the prism portions) when viewed from the direction of optical axis.

The prism portions of the projecting panel 13-A have the same area and four different deflection angles in the horizontal direction. They act to split a light beam transmitted through the projecting lens 12-A into four components in four horizontal directions as projected images with the same light amount. For this reason, the pattern image transmitted through the projecting lens 12-A is projected to the object side as a series of four pattern images arrayed and connected in the horizontal direction, as in the first embodiment.

The prism portions of the projecting panel 13-B have the same area and three different deflection angles in the vertical direction. They act to split a light beam transmitted through the projecting lens 12-B into three components in three vertical directions as projected images with the same light amount. For this reason, the pattern image transmitted through the projecting lens 12-B is projected to the object side as a series of three pattern images arrayed and connected in the vertical direction, as in the first embodiment.

The pattern images projected from the projecting panels 13-A and 13-B cross at the center of the frame, like the images shown in FIGS. 3 and 5. The pattern image projected by the projecting panel 13-A overlaps a position corresponding to focus detection regions 5-2 to 5-6 laid out in the horizontal direction of the object. The pattern image projected by the projecting panel 13-B overlaps a position corresponding to focus detection regions 5-1, 5-7, and 5-8 laid out in the vertical direction of the object.

In this embodiment as well, the first and second projecting systems A and B use, as the LEDs 11-A and 11-B, light sources having the same characteristics. The pattern image formed from a series of three pattern images formed by equally splitting the light beam from the LED 11-B into three components is brighter than the pattern image formed from a series of four pattern images formed by equally splitting the light beam from the LED 11-A into four components. For this reason, the contrast of the image signal received by the focus detection regions 5-1, 5-7, and 5-8 that are long in the horizontal direction becomes high, and the focus detection accuracy improves.

Further, in this embodiment, since the first and second projecting systems are constructed by the identical projecting units which comprise light sources having the same characteristics, identical pattern masks arranged in front of the light sources to form pattern images, and projecting optical elements having the same characteristics and a plurality of projecting optical axes, and since the first and second projecting systems are laid out to be phase-shifted each other by 90° when viewed from the direction of optical axis, the costs for construction can be saved.

(Third Embodiment)

Figure 9:
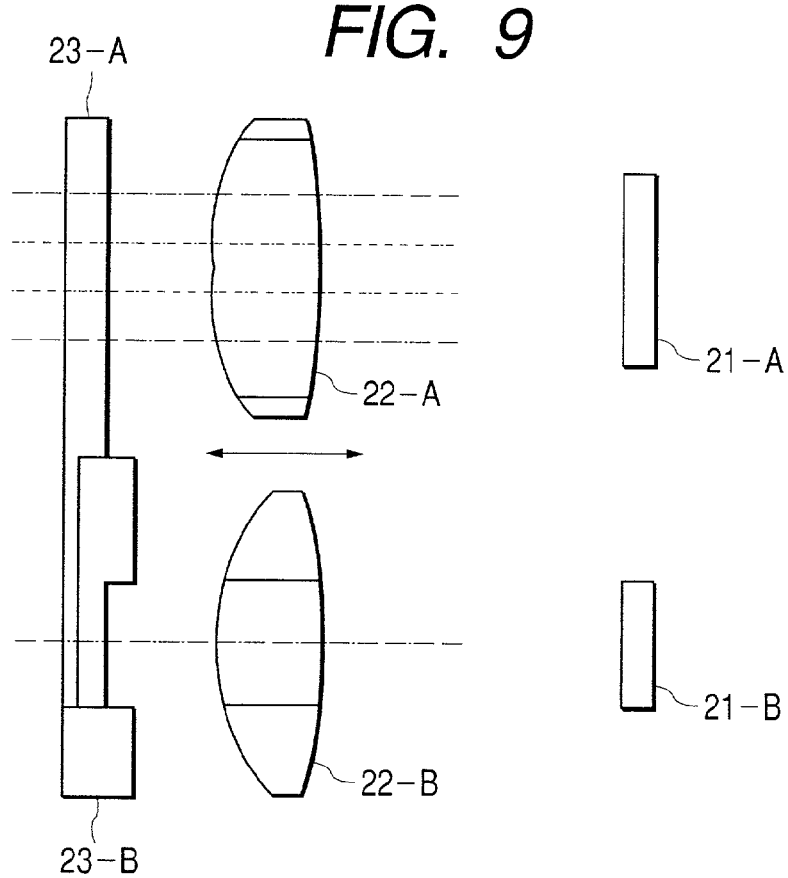
FIG. 9 is a sectional view of projecting systems in a projection apparatus according to the third embodiment of the present invention.
Figure 10:
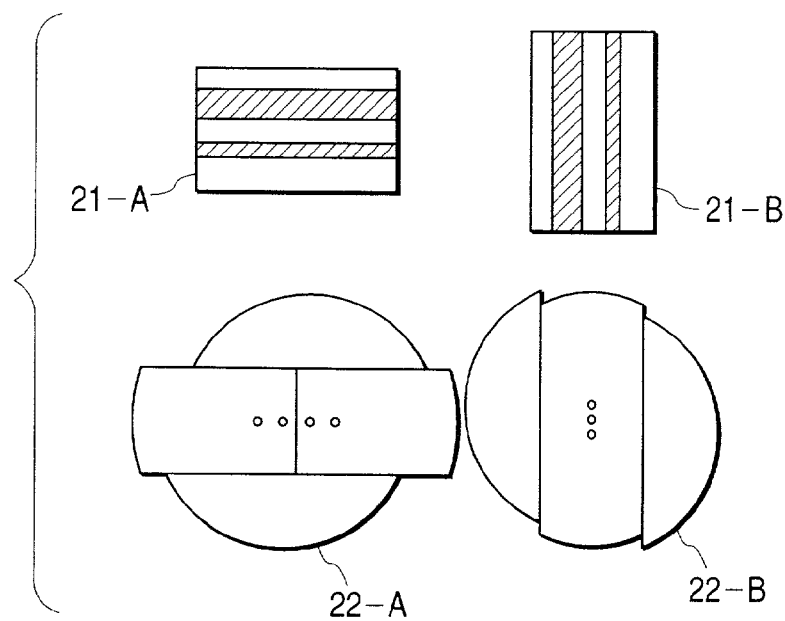
FIG. 10 is a front view of the projecting systems according to the third embodiment.

FIGS. 9 and 10 show the arrangement of a pattern image projecting systems in a projection apparatus according to the third embodiment of the present invention. FIG. 9 is a sectional view of projecting systems when viewed from the direction perpendicular to the optical axis. FIG. 10 is a front view showing only light sources and projecting lenses of the projecting systems when viewed from the direction of optical axis (front).

The projection apparatus of this embodiment is incorporated (or incorporatable) in a phototaking apparatus such as a camera or an observation apparatus such as a telescope and used for detecting the focus state of the phototaking system or observation system. Focus detection is performed using a pattern image projected by the projection apparatus by a focus detection apparatus provided in a phototaking apparatus or an observation appratus, and the result is sent to the control circuit of the phototaking apparatus or observation apparatus and used to control focusing of the phototaking system or observation system.

The projecting system is formed from a first projecting system A and second projecting system B, which are independent of each other.

Referring to FIGS. 9 and 10, an LED 21-A serves as the light source of the first projecting system A and has, in its front, a linear pattern electrode (pattern mask) as a first pattern extending in the horizontal direction. An LED 21-B serves as the light source of the second projecting system B and has, in its front, a linear pattern electrode (pattern mask) as a second pattern extending in the vertical direction.

A projecting lens 22-A of the first projecting system A corresponds to the light source 21-A. A projecting lens 22-B of the second projecting system B corresponds to the light source 21-B. The projecting lenses 22-A and 22-B are the same as the projecting lenses 2-A and 2-B of the first embodiment and respectively have four and three optical axes indicated by o in FIG. 10.

In this embodiment, the LEDs 21-A and 21-B (including the linear pattern electrodes) and the projecting lenses 22-A and 22-B have the same characteristics. The LED and projecting lens in the first projecting system A and those in the second projecting system B are phase-shifted each other by 90° when viewed from the direction of optical axis. When units formed from LEDs and projecting lenses with the same structures are used for the first projecting system A and second projecting system B, the focus detection apparatus can be made inexpensive.

Figure 11:
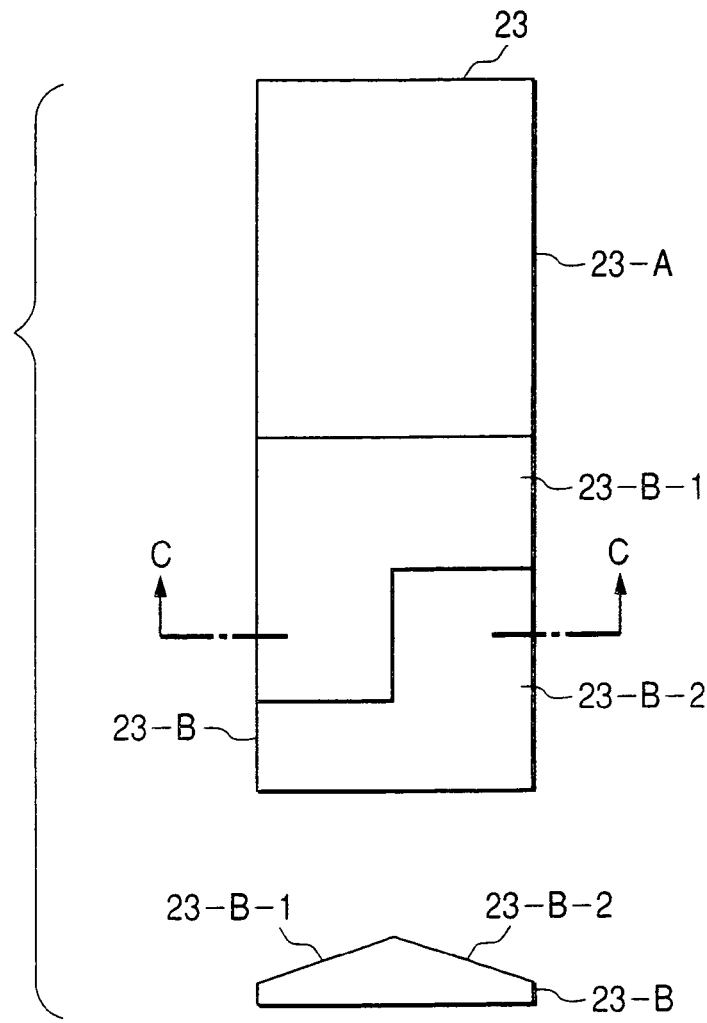
FIG. 11 shows a front view of a synthesizing projecting panel according to the third embodiment and a sectional view taken along a ling C—C.
Figure 12:
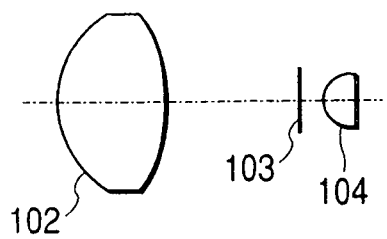
FIG. 12 is a sectional view of a projecting system in a conventional projection apparatus.
Figure 13:
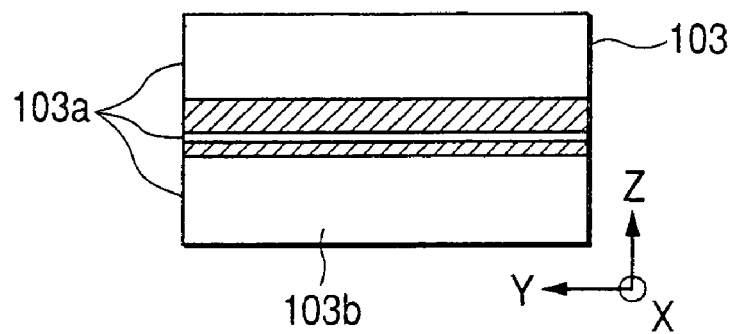
FIG. 13 is a front view of a projecting pattern in the conventional projecting system.
Figure 14:
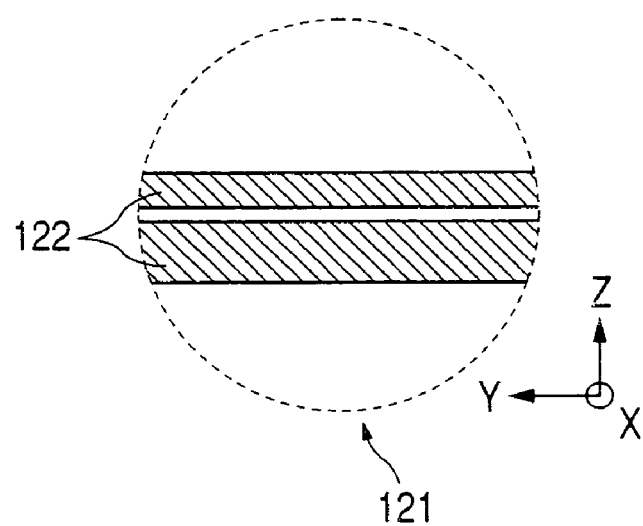
FIG. 14 is an explanatory view of a pattern image projected by the conventional projecting system and a projecting range.

A synthesizing projecting panel (synthesizing optical element) 23 shown in FIG. 11 has a prism portion for synthesizing four pattern images formed by the projecting lens 22-B into three images.

FIG. 11 shows front and sectional views of the synthesizing projecting panel 23. Of the synthesizing projecting panel 23, a portion 23-A is formed from a surface having no prism portion. Of the synthesizing projecting panel 23, a portion 23-B is a prism portion having two different deflection angles, as shown on the lower side of FIG. 11 (sectional view taken along a line C—C).

The prism portion 23-B has an optical function of overlapping four pattern images formed by the projecting lens 22-B to match the length of there pattern images in the vertical direction.

A pattern image transmitted through the projecting lens 22-A and the non-prism portion 23-A of the synthesizing projecting panel 23 is projected to the object side as a series of four pattern images arrayed and connected in the horizontal direction, as in the first embodiment.

A pattern image transmitted through the projecting lens 22-B and the prism portion 23-B of the synthesizing projecting panel 23 is projected to the object side as a series of connected images having the length of three pattern images.

The pattern images projected to the object side cross at the center of the frame, like the images shown in FIGS. 3 and 5. The pattern image projected by the projecting panel 23-A overlaps a position corresponding to focus detection regions 5-2 to 5-6 laid out in the horizontal direction of the object.

The pattern image projected by the projecting panel 23-B overlaps a position corresponding to focus detection regions 5-1, 5-7, and 5-8 laid out in the vertical direction of the object.

In this embodiment as well, the first and second projecting systems A and B use, as the LEDs 21-A and 21-B, light sources having the same characteristics. The pattern image formed from an image corresponding to three pattern images which are formed by splitting the light beam from the LED 21-B into four components and synthesizing them into three components overlapped at the central portion is brighter than the pattern image formed from a series of four pattern images formed by splitting the light beam from the LED 21-A into four components. For this reason, the contrast of the image signal received by the focus detection regions 5-1, 5-7, and 5-8 that are long in the horizontal direction becomes high, and the focus detection accuracy improves.

Figure 15:
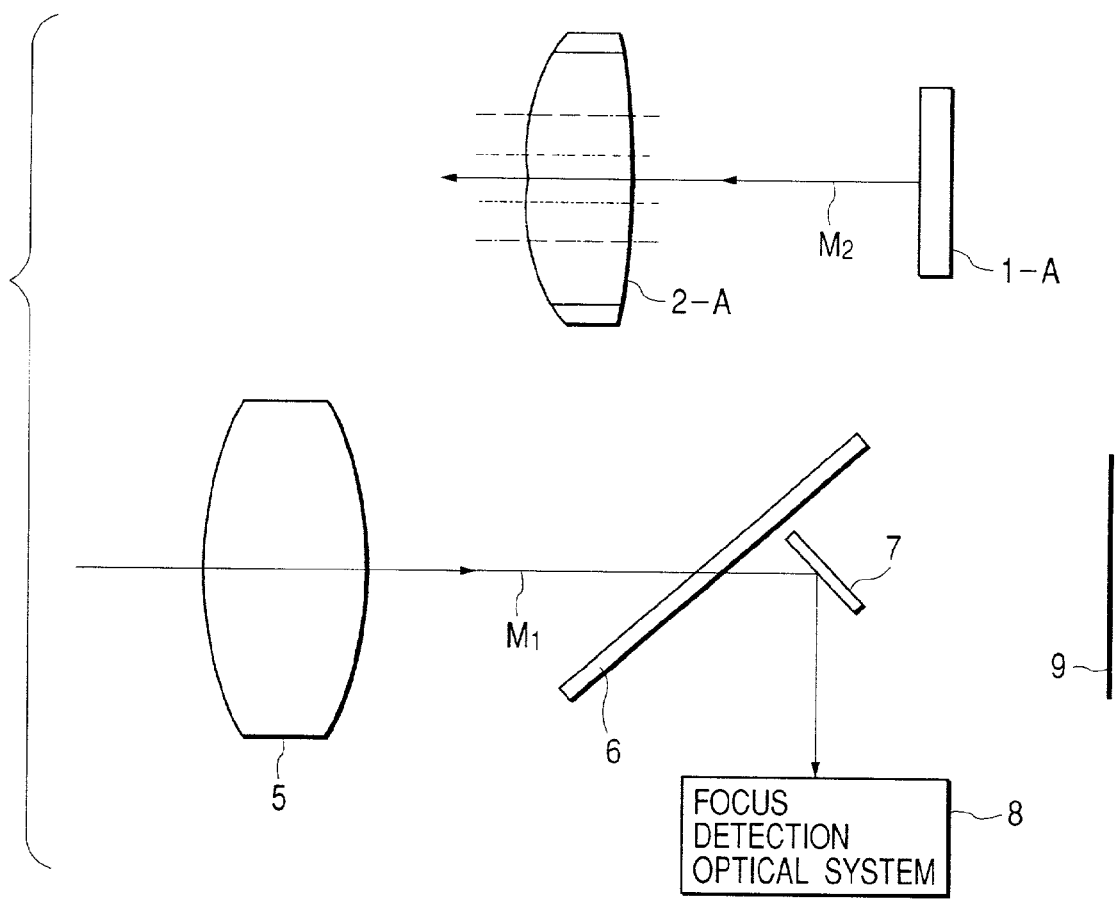
FIG. 15 is a sectional view of the main part of a phototaking apparatus mounting the projection apparatus according to an embodiment of the present invention.

FIG. 15 is a sectional view of the main part of a phototaking apparatus mounting the projection apparatus to which the present invention is applied. Referring to FIG. 15, a phototaking lens 5 has an optical axis M1. A light beam for focus detection is guided to a focus detection optical system 8 of the phototaking apparatus through a quick return mirror 6 for guiding the light beam to a finder optical system (not shown), and a reflecting mirror 7.

An image recording device such as a film or CCD is placed at an imaging position 9 of the phototaking lens 5. To guide the light beam from the phototaking lens 5 to the imaging position 9, the quick return mirror 6 and reflecting mirror 7 retreat from the optical path.

An auxiliary light projecting apparatus according to the present invention has an optical axis M2. The image of a patterned light source 1-A is projected to the object side through a projecting lens 2-A. In detecting a focus state, the pattern image projected onto the object is guided to the projection apparatus 8 through the phototaking lens 5, and focus detection is performed.

As has been described above, according to the present embodiment, a projection apparatus can be implemented, which can project a pattern image to a wide range of an object while obtaining a satisfactory imaging state with a few light sources and compact arrangement and, especially when focus detection regions that cross each other are laid out in two directions, can obtain a satisfactory focus detection result for both the cross portion and the focus detection regions other than the cross portion.

When a difference is generated between the brightness of the pattern image projected by one of the first and second projecting systems and that of the pattern image projected by the other projecting system, the contrast on the pattern image side can be increased, and the focus detection accuracy can be improved.

What is claimed is:

1. A projection apparatus which projects a pattern image onto an object so as to detect, by a phase difference scheme, a focus state of a phototaking system or observation system, said apparatus comprising:
    a first projecting system for projecting a first pattern extending in a first direction to a plurality of positions arranged in the first direction and including a central focus detection region on the object; and
    a second projecting system for projecting a second pattern extending in a second direction to a plurality of positions arranged in the second direction and including the central focus detection region on the object,
    wherein said first projecting system has a projecting optical element having a plurality of projecting optical axes in the first direction, and said second projecting system has a projecting optical element having a plurality of projecting optical axes in the second direction.

2. An apparatus according to claim 1, wherein a difference is generated between brightness of the pattern image projected by one of said first and second projecting systems and that of the pattern image projected by the other projecting system.

3. An apparatus according to claim 2, wherein said first projecting system and said second projecting system have light sources which have the same characteristics, and
    wherein the number of pattern images projected by said one of said first and second projecting systems is made smaller than the number of pattern images projected by said other projecting system so as to make the pattern image projected by said one projecting system brighter than that projected by said other projecting system.

4. An apparatus according to claim 1, wherein said projecting optical elements of said first and second projecting systems are lenses.

5. An apparatus according to claim 1, wherein said projecting optical elements of said first and second projecting systems are prisms.

6. An apparatus according to claim 1, wherein said first projecting system and said second projecting system have light sources which have the same characteristics,
    wherein said first and second projecting systems have identical pattern masks arranged in front of said light sources to form the respective patterns, and projecting optical elements which have the same characteristics and a plurality of projecting optical axes, and
    wherein said first and second projecting systems are laid out to be phase-shifted from each other by 90° when viewed from a direction of an optical axis.

7. An apparatus according to claim 1, wherein the number of pattern images projected by one of said first and second projecting systems is a predetermined number smaller than the number of pattern images projected by the other projecting system.

8. An apparatus according to claim 7, wherein said one projecting system has a synthesizing optical element for synthesizing the plurality of pattern images formed by a projecting optical element of said one optical system into the predetermined number of pattern images and projecting the pattern images.

9. A phototaking apparatus comprising:
    a focus detection unit for detecting a focus state of a phototaking system; and
    a mounting portion adapted to mount the projection apparatus of claim 1,
    wherein said phototaking apparatus detects a focus state of the phototaking system using a pattern image projected by the projection apparatus and performs a focus adjusting operation of the phototaking system on the basis of the detection result.

10. A projection apparatus which projects a pattern image onto an object so as to detect, by a phase difference scheme, a focus state of a phototaking system or observation system, said apparatus comprising:
    a first projecting system for projecting a first pattern extending in a first direction to a plurality of positions arranged in the first direction and including a central focus detection region on the object; and
    a second projecting system for projecting a second pattern extending in a second direction to a plurality of positions arranged in the second direction and including the central focus detection region on the object, wherein a difference is generated between brightness of the pattern image projected by one of said first and second projecting systems and that of the pattern image projected by the other projecting system.

11. A projection apparatus which projects a pattern image onto an object so as to detect, by a phase difference scheme, a focus state of a phototaking system or observation system, said apparatus comprising:
- a first projecting system for projecting a first pattern extending in a first direction to a plurality of positions arranged in the first direction and including a central focus detection region on the object; and
- a second projecting system for projecting a second pattern extending in a second direction to a plurality of positions arranged in the second direction and including the central focus detection region on the object,
- wherein said first projecting system and said second projecting system have light sources which have the same characteristics,
- wherein said first and second projecting systems have identical pattern masks arranged in front of said light sources to form the respective patterns, and projecting optical elements which have the same characteristics and a plurality of projecting optical axes, and
- wherein said first and second projecting systems are laid out to be phase-shifted from each other by 90° when viewed from a direction of an optical axis.

12. A phototaking apparatus comprising:
- a focus detection unit for detecting a focus state of a phototaking system; and
- a mounting portion adapted to mount the projection apparatus of claim 10,
- wherein said phototaking apparatus detects a focus state of the phototaking system using a pattern image projected by the projection apparatus and performs a focus adjusting operation of the phototaking system on the basis of the detection result.

13. A phototaking apparatus comprising:
- a focus detection unit for detecting a focus state of a phototaking system; and
- a mounting portion adapted to mount the projection apparatus of claim 11,
- wherein said phototaking apparatus detects a focus state of the phototaking system using a pattern image projected by the projection apparatus and performs a focus adjusting operation of the phototaking system on the basis of the detection result.

* * * * *

UNITED STATES PATENT AND TRADEMARK OFFICE
CERTIFICATE OF CORRECTION

PATENT NO. : 6,956,611 B2
DATED : October 18, 2005
INVENTOR(S) : Yusuke Omura

It is certified that error appears in the above-identified patent and that said Letters Patent is hereby corrected as shown below:

Column 3,
Line 30, "which has" should read -- which have --.
Line 50, "mount of" should read -- mount --.
Line 51, "an" should read -- a --.

Column 4,
Line 32, "ling" should read -- line --.
Line 64, "obsevation" should read -- observation --.

Column 6,
Line 62, "12B" should read -- 12-B --.

Column 7,
Line 1, "12B" should read -- 12-B --.
Line 7, "ectending" should read -- extending --.

Column 8,
Line 8, "appratus" should read -- apparatus --.

Signed and Sealed this

Second Day of May, 2006

JON W. DUDAS
*Director of the United States Patent and Trademark Office*